US012680856B2

(12) United States Patent
Wildey et al.

(10) Patent No.: US 12,680,856 B2
(45) Date of Patent: Jul. 14, 2026

(54) DEVICE, SYSTEM AND METHOD FOR RODLESS GUIDED MICROWAVE RADIATION

(71) Applicant: ROCHESTER SENSORS, LLC, Dallas, TX (US)

(72) Inventors: Chester Wildey, Euless, TX (US); Gagik Farmanyan, Plano, TX (US); Benjamin N. Lease, Flower Mound, TX (US); Lucas J. Ackerman, Richardson, TX (US); Michael Bowen, Allen, TX (US)

(73) Assignee: ROCHESTER SENSORS, LLC

( * ) Notice: Subject to any disclaimer, the term of this patent is extended or adjusted under 35 U.S.C. 154(b) by 208 days.

(21) Appl. No.: 17/873,059

(22) Filed: Jul. 25, 2022

(65) Prior Publication Data

US 2023/0077375 A1 Mar. 16, 2023

Related U.S. Application Data

(60) Provisional application No. 63/225,449, filed on Jul. 24, 2021.

(51) Int. Cl.
*G01F 23/28* (2006.01)
*G01F 23/284* (2006.01)
(52) U.S. Cl.
CPC .................................. *G01F 23/284* (2013.01)
(58) Field of Classification Search
CPC .................................................... G01F 23/284

(Continued)

(56) References Cited

U.S. PATENT DOCUMENTS

| 2004/0057683 A1* | 3/2004 | Shimizu ................ B29C 37/005 |
| | | 264/1.24 |
| 2005/0083229 A1* | 4/2005 | Edvardsson .......... G01F 23/284 |
| | | 342/198 |

(Continued)

FOREIGN PATENT DOCUMENTS

| JP | 2010190700 A | 9/2010 |
| WO | WO2001042746 A1 * | 6/2001 | ........... G01F 23/284 |

OTHER PUBLICATIONS

Pingping et al, "Polymer-coated symmetrical metal-cladding waveguide for chemical vapor detection with high sensitivity," Science China, Physics, Mechanics & Astronomy, Nov. 2012 vol. 55 No. 11: 2024-2029, doi: 10.1007/s11433-012-4857-8 (Year: 2012).*

(Continued)

*Primary Examiner* — Samarina Makhdoom
(74) *Attorney, Agent, or Firm* — Howard IP Law Group, PC

(57) ABSTRACT

A rodless guide microwave radiation device, system, and method is disclosed for measuring at least one characteristic of a liquid in a vessel. A hollow metal waveguide conveys microwave radiation and is adapted to be disposed in a vessel for containing a liquid, the waveguide having a first end and a second end. A single chip radar sensor mounted on a PCB is disposed proximal to the first end of the hollow waveguide. The radar sensor is configured to transmit millimeter wavelength signals into the first end of the hollow waveguide for propagating down the waveguide toward the second end, and receive a return echo from the signal based upon a change in impedance upon encountering the liquid and propagating in the reverse direction of the waveguide, the single chip radar sensor including electronic circuitry for determining at least one characteristic of the liquid located in the waveguide based on detection of an impedance change according to time domain reflectometry. A mount (Continued)

assembly is configured to position the single chip radar sensor mounted on the printed circuit board over the first end of the hollow waveguide for transmitting and receiving the microwave radiation via the hollow waveguide; and a barrier structure sealingly protects the single chip radar mounted on said printed circuit board from exposure to contaminants within the hollow waveguide, while permitting microwave propagation between the single chip radar and the liquid through the hollow waveguide. In embodiments, the waveguide may be rigid, bent, curved, or flexible, and the radar and PCB may be outside or within the waveguide.

26 Claims, 8 Drawing Sheets

(58) Field of Classification Search
      USPC .......................................................... 342/124
      See application file for complete search history.

(56) References Cited

U.S. PATENT DOCUMENTS

| | | | |
|---|---|---|---|
| 2007/0085729 A1 | 4/2007 | Edvardsson | |
| 2007/0115196 A1 | 5/2007 | Motzer et al. | |
| 2009/0033544 A1 | 2/2009 | Duivenvoorden | |
| 2009/0151446 A1* | 6/2009 | Champion | G01F 23/268<br>73/291 |
| 2009/0293610 A1* | 12/2009 | Fauveau | G01F 23/284<br>73/304 C |
| 2016/0266240 A1* | 9/2016 | Hughes | G01S 13/88 |
| 2018/0010949 A1* | 1/2018 | Ohlsson | H01P 5/103 |
| 2020/0217706 A1* | 7/2020 | Wildey | G01S 13/00 |
| 2021/0172785 A1* | 6/2021 | Rugnone | G01F 23/284 |

OTHER PUBLICATIONS

Patimisco et al, "Low-Loss Hollow Waveguide Fibers for Mid-Infrared Quantum Cascade Laser Sensing Applications," Sensors 2013, 13, 1329-1340; doi: 10.3390/s130101329 (Year: 2013).*
El-Maghrabi, "Electromagnetic Shielding Effectiveness Calculation for Cascaded Wire-Mesh Screens with Glass Substrate," Jul. 2018The Applied Computational Electromagnetics Society Journal (ACES) 33(6) 33(6) (Year: 2018).*
International Search Report and Written Opinion in PCT Application No. PCT/US2022/038239 mailed on Dec. 15, 2022, 13 pages.
Ritter, P., "Toward a fully integrated automotive radar system-on-chip in 22 nm FD-SOI CMOS", International Journal of Microwave and Wireless Technologies, Cambridge University Press, vol. 13, Special Issue 6, pp. 523-531, Feb. 11, 2021.

* cited by examiner

Exploded View

Section View

DEVICE, SYSTEM AND METHOD FOR RODLESS GUIDED MICROWAVE RADIATION

CROSS-REFERENCES TO RELATED APPLICATIONS

This application claims priority under 35 USC 119 to provisional patent application Ser. No. 63/225,449 filed on Jul. 24, 2021, the subject matter of which is incorporated by reference herein in its entirety.

FIELD OF THE INVENTION

The present disclosure relates generally to measurement systems, and more particularly, to a system and method for guiding microwave radiation to measure one or more properties of a fluid.

BACKGROUND

Various devices exist for measuring or monitoring characteristics or properties of a material. Guided wave radar (GWR) devices are devices that guide electromagnetic radiation down a waveguide to measure the properties of a fluid (e.g. liquid or gas) and/or the interface between two media. Such properties include the distance down the waveguide to a liquid, the relative dielectric constant of the liquid and the dissipation factor or loss tangent of the liquid. Additional information concerning the liquid dielectric constant and/or dissipation factors may be obtained by exciting the transmitter element across multiple frequencies and observing material properties at each frequency, which method is called frequency spectroscopy.

The dielectric constant and dissipation factors may also yield information on material composition. For example, material aging or degradation can be determined by measuring changes in the dielectric constant and dissipation factor. One such application is the aging of anhydrous ammonia to determine dosing for preserving chemicals. As chemicals are expensive, determination of the appropriate dosage reduces costs by saving on excess chemical usage. Measurement of dielectric constant and dissipation factor can also be used to identify a material, as from a list of materials, for example, for determining the presence of diesel fuel or biodiesel fuel.

In prior art systems employing GWR devices, since the mounting location of the sensor is known, measurement of the distance from the sensor to the liquid level gives the level of the liquid in a container. For example, the level of fuel in a tank on a vehicle may be measured and the information used to determine fuel consumption and/or time to refuel. Variations in the level can be used to determine vehicle movement, and this information can be used to trigger alarms. For example, if the vehicle exceeds a prescribed degree of allowed tilt. Movement information can also be used to determine fuel theft or vehicle theft. For example, if the information is directed to a control system having a clock and a pre-set schedule of service or telemetered to such a system, then vehicle movement at a time divergent from the pre-set schedule (e.g. detected movement in the middle of the night), may be characterized as fuel or vehicle theft and the situation communicated to the proper authorities.

While present GWR systems possess multiple advantages over other level measurement systems (e.g. capacitive, optical, and ultrasonic), problems still exist, at least with regard to positioning of gauges within various environments, including high pressure, low clearance, tortuous pathways, and/or high sensitivity applications, as well as difficulties associated with interfaces between the sensor, its discrete electronic components (e.g. for electronics calibration, resolution, data processing, and system accuracy) and interactions and communications with waveguide structures for conveying the electromagnetic radiation within the vessel. Alternative guided wave radar sensing devices, systems, and methods for GWR processing for sensing at least one characteristic of a liquid within a vessel are desired.

SUMMARY

In one aspect, a guided wave radar sensor gauge for measuring at least one characteristic of a liquid in a vessel, comprises: a hollow waveguide for conveying microwave radiation, the hollow waveguide adapted to be disposed in a vessel for containing a liquid, the hollow waveguide having a first end and a second end. A single chip radar sensor is mounted on a printed circuit board (PCB) and disposed proximal to the first end of the hollow waveguide. The single chip radar sensor is configured to transmit a millimeter wavelength signal into the first end of the hollow waveguide for propagating down the waveguide toward the second end, and to receive at least a return echo from the signal based upon a change in impedance upon encountering the liquid and propagating in the reverse direction of the waveguide, the single chip radar sensor including electronic circuitry for determining at least one characteristic of the liquid located in the waveguide based on detection of an impedance change according to time domain reflectometry. A mount assembly is configured to position the single chip radar sensor mounted on the printed circuit board over the first end of the hollow waveguide for transmitting and receiving the microwave radiation via the hollow waveguide; and a barrier structure sealingly protects the single chip radar mounted on said printed circuit board from exposure to contaminants within the hollow waveguide, while permitting microwave propagation between the single chip radar and the liquid through the hollow waveguide.

In one aspect, the rodless guided wave radar (RGWR) device comprises an electronics assembly including a printed circuit board (PCB) having electronic circuit components integrated thereon, and a mechanical structure. The PCB contains circuitry comprising an RF energy radar ranging system where RF energy is transmitted from the radar "chip", is directed to the target liquid surface by the mechanical structure, reflects from the surface, and is then received by the chip. The chip contains integral transmit and receive antennas configured for the frequency of RF energy. In an embodiment, frequencies for use fall within the range of 1 GHz to 500 GHz. In an embodiment, the radar chip contains all RF processing components to extract the reflection data vs time. In contrast to prior systems, which, for example, utilized designs having discrete electronic components and which employed transmission lines and structural components (e.g. electrodes and supporting structures for coaxial transmission lines) for directing energy, embodiments of the present disclosure provide a low cost, high efficiency rodless GWR device, system, and methodology utilizing a single integrated RF and hollow waveguide structure and mechanical support for measuring liquid level characteristics within a vessel. The PCB contains processing means to extract from the data the distance to the liquid surface using the formula distance=rate×time, where the rate is the speed of the RF energy in the measurement environment. In one embodiment, the PCB incorporates a single system on a chip (SOC) radar chip containing transmit and receive circuitry for the RF energy and transmit and receive antennas. By way of non-limiting example, a single integrated RF radar chip such as a 60 GHz Pulsed Coherent Radar (PCR), with integrated baseband, RF front-end, and antenna in package (AiP) having a small footprint (e.g. 29 mm$^2$) may be implemented, such as the A111 PCR radar chip provided by Acconeer. Other such pulsed radar chips having integrated antenna and receiver processing components may alternatively be implemented. The PCB also contains processing means for the level data and a memory for parameter storage such as calibration data, configurations, and stored program files. By way of non-limiting example, the processing functions include data processing of echo profiles reflective of the time recordings of the returned amplitude data from the radar pulse(s) transmitted into the hollow waveguide, as is understood in the art. For example, subsequent transmissions of electromagnetic energy pulses or bursts during a measurement cycle capture data points at different locations along the waveguide. Data relating to the length of the elongate measurement probe, number of transmissions of electromagnetic energy pulses or bursts per measurement cycle, distance between data points, and other parameters are utilized by the system to develop echo profiles and analysis windows for determining characteristics associated with the liquid under test. Software processing and algorithmic components operate to process the returned data, using time domain reflectometry techniques, to provide measurement results as to the liquid level within the vessel, as is understood by one of ordinary skill in the art.

In an embodiment, the mechanical means consists of an electrically conductive hollow structure, which, in one embodiment, comprises a metal or metallized tube, connected to a mounting means. The mounting means, in one embodiment comprises a standard mount such as a mounting or mating flange and threaded connections. The mount assembly includes a mounting surface configured to position the PCB containing the radar chip directly above the tube or down a predetermined distance into the tube. In embodiments, mounting distances for the PCB containing the radar chip may range from about 6 inches from ("above") the tube surface (i.e. first end of hollow waveguide), or in another embodiment, to about 24 inches into the tube body relative to the tube surface. In embodiments, as echo waveforms are different based on the source positioning (i.e. within the tube or outside or "above" the tube), additional mechanical challenges may be associated with PCB and radar chip positioning within the tube. That is, as the radiation pattern for the radar transmitter chip is across 180 degrees, the mechanical mounting structure containing the PCB and chip positioned outside of the tube, allows for increased mechanical size, but may result in signal loss (radiation outside of the tube) and/or noise echoes affecting measurement processing, especially at very high liquid levels. In embodiments, such difficulties may be overcome by inclusion of a nosepiece assembly for placement of the radar chip within the tube, to mitigate echo processing difficulties. However, such positioning may result in mounting challenges, due at least in part to reduced mechanical footprint requirements within the confines of the waveguide. Different positioning aspects of the single integrated radar chip and mount structure may be implemented according to environmental, spacing, and/or accuracy requirements.

In an embodiment, the mechanical structure contains a seal to protect the PCB from the measured liquid and/or the associated vapors and from the measurement environment which may include dust, dirt, water, splashed fuel or chemicals or other adverse conditions (e.g. seal impervious to fluid). In one embodiment, the seal is a permanent part of the metal structure and comprises a glass or crystal window such as sapphire or quartz fixed into the waveguide by fusion or with O-ring or metal seals. In other embodiments, the window may comprise a ceramic material. Such alternatives may be particularly relevant in situations where glass windows (or other materials) are not allowed, for example in the measurement of liquid levels of certain propane tanks.

In an embodiment, there is provided an integral subassembly containing the radar chip, PCB and electronics, including by way of example, encapsulating the electronics inside a material (e.g. a molded polymer material or molded plastic). Encapsulation may also be implemented, for example, by one or more epoxy and acrylate resin based sealing and molding compounds. Further still, in an alternative embodiment, encapsulation over the radar chip may advantageously embody the encapsulant configured into the shape and functional attributes of a lens for focusing or collimating the RF energy. Incorporating the lens into the encapsulant eliminates the need for an external lens, and advantageously reduces costs as well as reducing component size and overall footprint associated with the RGWR device. In one embodiment, the radar chip may be advantageously positioned inside the waveguide tube and mounted into a plastic enclosure subassembly. In an embodiment, the enclosure subassembly may be inserted into the end of the tube during factory assembly. In an embodiment, the enclosure would serve as the interface between the PCB holding the radar chip and the metal tube/flange, and would also protect the electronic circuitry from the environmental contaminants (e.g. fuel and vapors). In a further embodiment, the PCB and radar chip may be disposed within the waveguide housing, with additional electronic circuitry for performing processing on the data (e.g. calibration, analytics, filtering, memory, etc.) outside of the waveguide and communicatively coupled thereto (e.g. via wired or wireless communications) for providing real-time communications and data processing.

DETAILED DESCRIPTION

Embodiments of the present disclosure are described herein with reference to the accompanying drawings for purposes of illustration.

Figure 1:
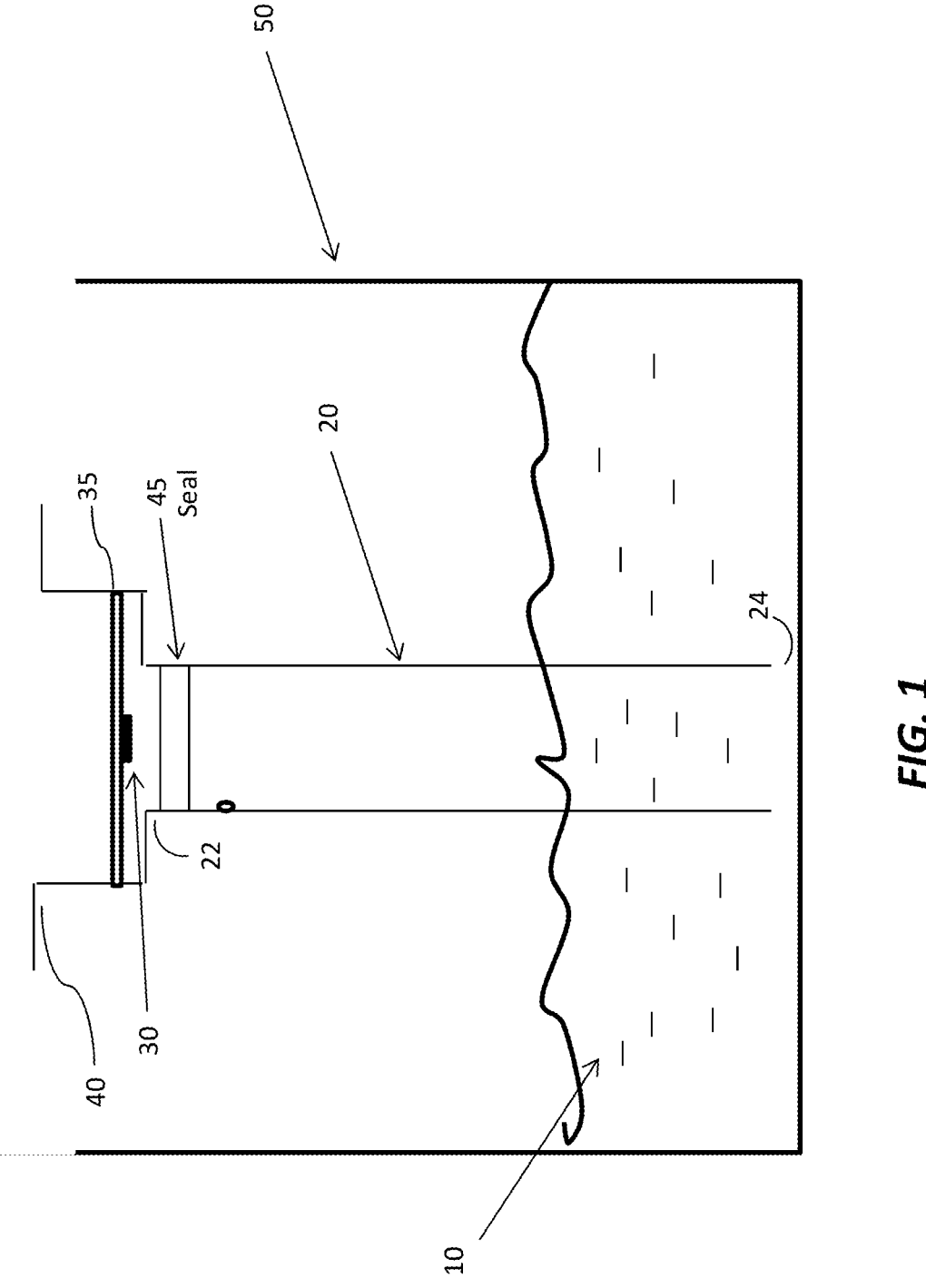
FIG. 1 shows an exemplary illustration of components of a rodless guided wave radar liquid measurement device according to an embodiment of the present disclosure.

Referring to FIG. 1, in one aspect, a rodless guided wave radar (RGWR) sensor gauge 100 is shown for measuring at least one characteristic of a liquid 10 (e.g. propane) contained in a vessel 50, such as a pressurized propane tank. A hollow waveguide 20 is disposed in the tank for conveying microwave radiation and includes a first end 22 proximal to a top end of the tank, and a second end 24 distal to the top end of the tank. A single chip radar sensor 30 is mounted on a printed circuit board 35 and disposed proximal to the first end 22 of the hollow waveguide 20. The single chip radar sensor is configured to transmit millimeter wavelength radar pulse signals into the first end of the hollow waveguide for propagating down the waveguide toward the second end, and to receive return echoes from the signals based upon a change in impedance when encountering the liquid 10 and propagating in the reverse direction in the hollow waveguide 20. The single chip radar sensor includes electronic circuitry and associated algorithms for generating and determining pulse transmission signals and pulse start/stop times, delays, reception of echo signals, and processing components (see e.g. FIG. 8) for determining at least one characteristic of the liquid located in the waveguide based on detection of an impedance change according to time domain reflectometry techniques, as is understood by one of ordinary skill in the arts. A mount assembly 40 is configured to position the single chip radar sensor mounted on the printed circuit board over the first end 22 of the hollow waveguide for transmitting and receiving the microwave radiation via the hollow waveguide. A barrier structure 45 (seal) sealingly protects the single chip radar 30 mounted on the printed circuit board 35 from exposure to contaminants within the hollow waveguide 20, while permitting microwave propagation between the single chip radar 30 and the liquid 10 through the hollow waveguide 20.

Figure 2B:
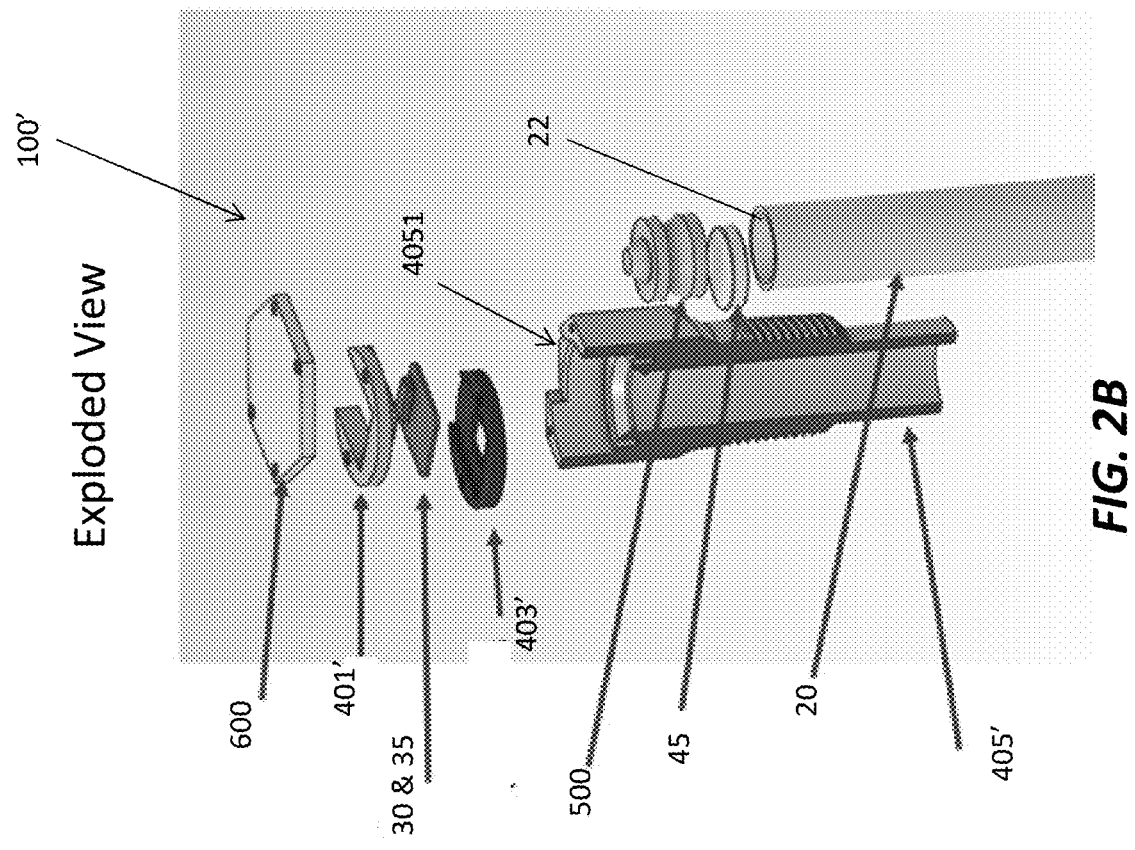
FIGS. 2A and 2B show integrated section and exploded notional views, respectively, of an exemplary rodless guided wave radar liquid measurement device and components thereof, according to another embodiment of the present disclosure.
Figure 2A:
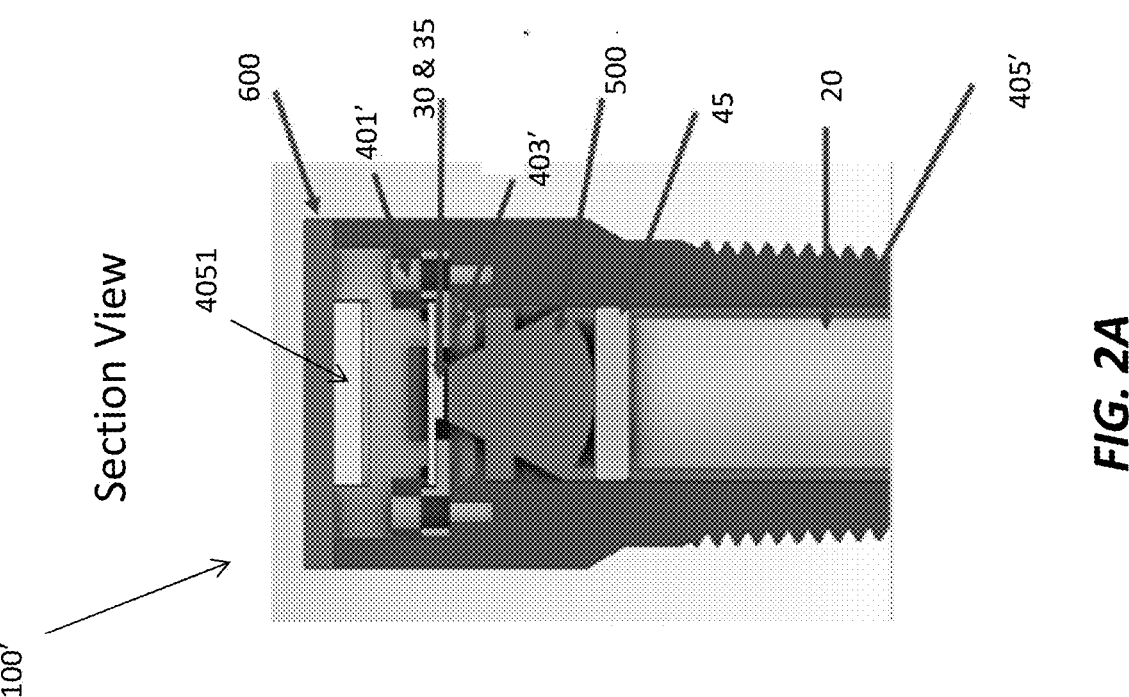

FIGS. 2A-2B illustrate another exemplary embodiment of the present disclosure, for purposes of illustration. As shown therein, RGWR 100' includes a hollow metal or metallized tube 20 for conveying electromagnetic radiation therethrough from/to a radar chip module comprising a single radar chip sensor 30 mounted on PCB 35. By way of example, tube 20 may comprise a 0.75 outer diameter (OD)×0.65 inner diameter (ID) size structure (e.g. std. McMaster Carr). In this embodiment, a redirecting structure such as lens 500 is disposed between the radar chip module and metal tube 20 for focusing or collimating the electromagnetic radiation between the radar chip module and opening 22 (see FIG. 1) for uniform mode propagation through the waveguide and impingement and reflection/echo waveform propagation back to the receiver at the radar chip module. By way of example, lens 500 may be a three-dimensional (3D) printed ABS lens structure. Lens 500 is positioned within upper portion 4051 of hardware subassembly 405'. Hollow metallic waveguide tube 20 is inserted into the hardware subassembly 405' and configured such that the subassembly surrounds tube 20. In the illustrated embodiment, a glass window 45 (e.g. borosilicate glass) tuned for 60 GHz operation is fixedly positioned within tube 20 such that lens 500 is sandwiched between the radar chip module and the glass window. Radar nest clamp 401' and radar chip nest base 403' operate to structurally mount, position, and fixedly retain the PCB and radar chip directly above the waveguide, and function to interface the PCB to the larger hardware structure.

As shown, the radar chip module in this embodiment is positioned outside of (i.e. above) the hollow waveguide. In this embodiment, the glass window or seal 45 is used to seal off the radar chip module and thereby seal off contaminants such as particles, gases, and/or liquids. A lid 600 (e.g. machined with four 4-40 screws) and element 405' (e.g. 1" (inch) NPT with 1.5-inch hex) may be implemented. Such embodiment may be particularly useful in high pressure applications, such as measuring propane levels in a tank.

In another embodiment (see e.g. FIG. 3), the PCB containing the radar chip module, and accompanying mounting structure may be mounted within the hollow tube 20. As described, mounting within the tube may eliminate the lens structure. While the radiation signal/echo quality may suffer slightly due to elimination of element 500, corrections may be accomplished by one or more electronic compensation modules (not shown) in the form of software, signal processing and/or filtering algorithms which may be implemented to correct for such deficiencies and enhance signal quality, while reducing the footprint of the mechanical assembly and cost associated with avoidance of additional or unnecessary elements for given applications.

In the case of radar chip module mounted within the tube 20, the mechanical assembly securing the circuit board is to be reduced (smaller footprint) in order to be physically retained within the inner diameter of the hollow waveguide. The concurrent size reduction of the PCB may result in the surface area being insufficient to render the electronic circuitry necessary for sensor performance, such as calibration circuitry, memory, profile data, clock and time sequencing, controller processing, algorithmic signal processing, communications, and data analytics processing, to be contained on the PCB. In another embodiment, a separate PCB containing at least some of the electronic component functionality may be designed separate from (e.g. outside of) the hollow waveguide on a structure capable of mounting on or near the vessel and communicatively coupled to the PCB containing the radar chip for electrical/electronic connection and real time communications between the two circuit boards. In still further embodiments, the glass window (e.g. 45 of FIG. 2A, FIG. 2B) may not be required for applications not subject to high pressure environments. In this case, the mechanical structure for supporting the circuit board containing the radar chip may also serve the dual purpose of a seal or barrier to prevent contamination or liquid in the tube from contacting the chip module. In an exemplary embodiment, a molded plastic or other material that fits coaxially within the waveguide tube may serve as the protective barrier and mechanical mounting and support structure.

Further elements, features, and applications as embodied in aspects of the present disclosure are described in greater detail herein.

Factory Calibration. As described herein, the RGWR is configured to use microwaves, typically in the range of 1 GHz to 500 GHz. In the hollow waveguide system as described, the inner diameter (ID) of the waveguide (typically a round metal tube embodied in the RGWR) is chosen based on the particular frequency(s) used, with a general rule that the higher the frequency, the smaller the ID of the tube. Physical constraints often require that the tube used in a particular application be of larger diameter than would preferably be used for the chosen frequency. For example, the tube is to be mechanically robust so as to withstand the stresses of use in heavy machinery such as tractors, construction, or mining equipment. However, an oversized tube propagates multiple modes of electromagnetic (EM) energy, with different modes traveling at different velocities. Since the basic operation of the RGWR gauge is as a function of distance=rate×time, changes in the EM propagation velocity will affect distance measurements by introducing unwanted errors in the level reading. Due to wave effects, these errors will not be constant but will vary with the level of the liquid. For this and other reasons relating to lower RGWR manufacturing expenses, the gauges will present errors in reading linearity, with some of the errors being unique to a specific gauge. To improve the accuracy of the level reading it is desirable to factory-calibrate each RGWR, and to store the results of the calibration in each individual gauge in the form of a look up table or a correction formula. In this way, the gauges may be manufactured inexpensively but still maintain a high accuracy for the customer in the field. Factory calibration techniques and electronic processing of transmit and receive signals may be utilized for the RGWR device, system, and method of the present disclosure, in accordance with the processes depicted in FIGS. 29-31 and described in copending U.S. patent application Ser. No. 16/173,993 filed on Oct. 29, 2018, and assigned to the present applicant, the subject matter of which is incorporated by reference herein. Slight changes to the calibration process may be required due to the measurements having different characteristic noise signatures at the top and bottom of the measurement span.

Leak Detection. In another aspect, while leak detection is important for heavy vehicle fuel tanks, it is of particular importance in the propane industry wherein a small pressure leak in the tank or connected fittings can cause a hazardous situation and can also leave tanks unexpectedly empty. For example, a busy restaurant might find propane tanks used for cooking fuel empty at opening time. To address this problem the RGWR is programmed with a leak detection algorithm. The unit is programmed with a normal fuel draw-down rate and maximum usage (e.g. maximum consecutive hours of use time, or maximum use time per day). In operation, the RGWR measures and stores in memory (e.g. see FIG. 8) the level on a periodic basis. This information is then used by the system to calculate the liquid withdrawal rate. In an embodiment, the system is programmed to execute an algorithm whereby, if the calculated rate exceeds the programmed rate, or on the condition that the withdrawal rate is detected during a time interval outside of a preset condition (e.g. outside the hours of normal operation), then a system control processor executes a command issuing an alarm. The alarm can be communicated via a front panel visual indicator or sounder on the RGWR, or by wired or wireless connection to an on-site control system or indicator or to an off-site control system or indicating system. For example, the system may be programmed such that the leak detection alarm could be forwarded to an application on a cellular telephone. As an alternative to using pre-programmed alarm settings, the unit may be programmed to automatically determine the nominal liquid withdrawal rates and hours of operation, by recording and comparing level data over a period of time. In another embodiment, the unit may be configured to modify the stored alarm set points by using accumulated observed time-stamped level readings.

Waveguide Pressure Seal. In an embodiment of the present disclosure, and as described herein, a central component of the RGWR is a hollow tube, which tube is typically made from metal. One end of the tube is immersed in the liquid to be measured, and EM waves are directed down the tube from an electronics module comprising the radar chip mounted onto the PCB at the front end (22) or un-submerged end of the tube. The EM waves travel along the tube until they meet the liquid level and some percentage of the energy is reflected back toward the electronics. The electronics module receives this energy and measures the elapsed time since the start of transmission and calculates the distance to the liquid. For many liquid containers it is undesirable or impossible to leave the liquid uncontained, and for these applications, sealed containers are used. For example, in propane storage it is necessary that the tank contain the pressure as the propane boils at standard atmospheric temperatures and pressures. To answer these needs while maintaining the ability to make the measurement, a dielectric window 45 is inserted into the hollow waveguide, as illustrated for example, in the embodiment of FIG. 2. The dielectric window 45 will be fused to the waveguide, or will alternatively be held in place using O-rings or metal seals. The dielectric window must operate to allow EM energy to pass substantially unimpeded from the electronics side to the liquid side. For this reason it is desirable that the window have a low loss tangent. It is also desirable that the window have a minimum value of relative dielectric constant in order to avoid reflections from the window reaching the receiver, which reflections could compete with the signal from the liquid level. The window should also be chemically resistant to the liquid and must withstand the pressure in the container. The window should also meet established safety regulations, for example, it must withstand fire and shock. In one embodiment, the RGWR incorporates a glass window fused to the ID of the waveguide. By way of non-limiting embodiment. The window shall be between 0.062 inches and 6 inches in thickness. The window shall be placed a minimum of 0 inches, and a maximum of 24 inches from the electronics module. The glass window may also contain small amounts of other materials for pressure-resistant windows, as is known in the art.

In embodiments of the disclosure, one technique known in the art to create a microwave level measurement system is to use a system-on-chip (SOC) integrated circuit containing all or substantially all of the RF components in a single chip While this arrangement is suitable for measuring the level of water and other essentially inert liquids, for more aggressive liquids more protection is needed for the SOC and for the PCB on which is it mounted. According to a further aspect, the RGWR incorporates a dielectric covering over the SOC (30/35). In an embodiment, it is preferable for the covering to have a low relative dielectric constant (e.g. 4 and below) and to have a low loss tangent to avoid problematic reflections. The covering may be a separate piece into which the PCB and SOC are assembled, or may be integral with the assembly configured as an injection over-molded assembly. Suitable covering materials include ABS, PVC, CPVC, Acetal, Teflon, Kynar, rubber or other chemically resistant polymers or plastics may be used as known in the art. In another embodiment, the applied covering may be a conformal coating applied to the PCB, such coating known in the art but heretofore not applied as protection for a SOC radar chip in level measurement. According to still a further aspect, the invention also applies to SOC level measurement radars meant to be used in free space without the hollow waveguide.

According to another aspect of the present disclosure, certain level measurement applications may not accommodate straight-tube waveguides. For example, in measuring the sump oil level for an engine, there is often no straight-line access to the oil pan. Another example concerns measuring the oil level for the propeller gears in an outboard marine engine, where no straight-line access is available through the motor's lower housing. The present disclosure solves this problem wherein the RGWR can incorporate a curved or bent waveguide. The curve(s) in the waveguide allows access to the liquid for measurement while still guiding the EM energy and enabling the measurement via the RGWR. According to an aspect, the curves or bends in the hollow waveguide is preferably a gradual bending, as is known in existing art related to microwave waveguides. Such curved waveguides represent an improvement by providing a low cost RGWR waveguide approach to level testing not previously used such environments, and further, that in such applications the waveguides used are several times larger in cross section (e.g. about 6 times larger) than for standard waveguides (~0.188 in). By way of example, the most efficient 60 GHz microwave transmissions would use very small diameter waveguides (a few millimeters diameter sized structure) which would efficiently convey the electromagnetic radiation without significant energy fragmentation or having different parts of the waveguide profile propagate at significantly different speeds. In the present application, the RGWR unconventionally forms relatively large diameter hollow waveguide structures for conveying electromagnetic information, and does so at the expense of efficiency and sub-optimal energy loss and echo noise due to the energy fragmentation, however, the RGWR large cross section configuration enables a more robust, durable structure that enables fluids (e.g. viscous fluids) to more easily flow in and out of the device. Moreover, the RGWR's measurement length is relatively short, generally on the order of only a few meters (e.g. vehicle fuel tank lines), which enables the RGWR to perform sufficiently well, despite significant loss due to energy fragmentation resulting from mismatched propagation frequency and diameter size. The behavior of such large cross section waveguides when adapted to be curved may not be so well understood and may require non-trivial amounts of analysis and experimentation to fully characterize.

In certain tank level measurement applications there is often only a small clear area above the tank. For example, for fuel tanks on refrigerated trailers, the tanks are nestled below the bed of the trailer and typically with very limited room (e.g. only a few inches) or space as measured from the top of the tank to the bottom of the trailer bed. These structural constraints create a problem if a long fuel gauge needs to be removed from the tank. Removing the gauge in this case necessitates removal of the tank from the trailer, which means first draining the tank, both of which are labor intensive and time consuming. Adding to the expense is that the trailer is not available for use during this time. To solve this problem, in one embodiment of the RGWR, the electronics module is constructed as a distinct element separate from the waveguide tube. As discussed, embodiments of the present disclosure provide that the waveguide tube incorporates the flange mounting to interface to the fuel tank, and is installed and connected to the fuel tank, with the waveguide tube extending down into the tank. The electronics unit is constructed as a 'puck' or low-profile enclosure (incorporating the electronics and having a total height of only a short distance (e.g. 1 or 2 inches), and incorporating mechanical means to connect to the flange mounting of the waveguide. This advantageously allows removal of the electronics unit without the need to remove the waveguide tube. Since the electronics unit height is only 1 or 2 inches, it can be removed without the need for removing the tank from the trailer, providing for easy replacement of the electronic components of the RGWR. By way of non-limiting example, the removable mount interface can be a 5-bolt flange, a threaded connection to the waveguide, a bayonet lock or a ¼ turn flange.

In another aspect of the disclosure, the RGWR system and method enables enhanced blanking reduction The RGWR transmits energy into the waveguide and then receives the reflected echoes from the liquid level. This requires that the transmit and receive portions of the electronics be in close proximity to each other. This causes unavoidable bleed in the signal directly from the transmitter to the receiver, and this bleed signal causes the receiver to be less sensitive or even to falsely detect echoes for distances close to the electronics. As a result of this phenomenon, such measurements systems typically have a dead zone or blanking zone near the transmitter/receiver where they cannot measure. Since the principle of operation of the gauge is distance=rate×time, this corresponds to a short time after transmitting when the receiver cannot see or detect the level. It is important to note that distance is a derived quantity, derived from the elapsed time between the transmit and the received echo and the speed of the EM energy. The elapsed time and the speed of the EM signal are the physically primary quantities. This means that the blanking zone is best understood as a short time interval in which the receiver is insensitive to received echoes. The length of this blanking zone is related to both the echo time and the speed of the EM energy propagation. To reduce the blanking zone distance the RGWR, in one embodiment, incorporates a material plug directly in front of the electronic module that reduces the speed of the EM energy. In one embodiment, the material may be incorporated into the window 45 (e.g. by increasing the thickness of the window). In another embodiment, the material plug may be inserted as a separate element inserted between the window and the radar chip. In another embodiment, the plug may be inserted between the lens (e.g. 500 of FIG. 2A/B) and the radar chip. Inclusion of the plug results in a reduced blanking zone for a given blank time by a factor of the square root of the relative dielectric constant of the so placed material plug. It is desirable that the material plug have a high dielectric constant and have a low loss tangent to thereby slowdown the EM waveforms. Suitable materials for such element(s) include ABS, PVC, CPVC, Acetal, Teflon, Kynar, rubber or other chemically resistant plastics, as are known in the art. The material plug is configured to be positioned within the waveguide so as to substantially fill the waveguide inner diameter, in order to avoid propagation mismatches. In one embodiment, the material plug extends from a position contacting the chip face to a predetermined distance (e.g. 6 inches) down the tube and has a length ranging from 0.5 inches to 14 inches.

In another aspect of the disclosure, the RGWR system and method enables a flexible RGWR waveguide structure. While a rigid conductive metal waveguide is optimum for most applications, some applications require a flexible tube. For example, where the measurement of level is needed at the bottom of a structure with a complex path to the liquid surface. One example is for oil level in locomotive applications. In these cases, a rigid waveguide, even when bent, cannot be used, as it cannot be threaded into the required space. According to an aspect of the present disclosure, the RGWR may be configured so as to comprise a flexible waveguide. The flexible RGWR waveguide device can be constructed from metal sections as for flexible metal conduit, or the flexible waveguide may be constructed of a plastic material treated so as to be conductive. Examples include carbon or metal filled plastics, or the plastic waveguide can be treated with a metal coating on the ID or OD as in sputtering aluminum on Mylar. Such flexible waveguide is slightly conductive (static electricity conductive). The plastic insulator can also covered using metal foil, by way of non-limiting example. Application of a radar chip gauge coupled to a flexible (e.g. plastic) hollow waveguide, is particularly effective for high vibrational applications. Unlike rigid waveguide structures, which are susceptible to interference and damage caused by vibration of the rigid structure at resonant frequencies, flexible waveguide structures as disclosed herein experience no such problems. Moreover, for heavy duty applications (e.g. mine trucks, construction equipment, etc.) where it is essential to keep the vehicles up and running, fuel tank monitoring is critical, particularly monitoring at the bottom of the tank. For RGWR rigid waveguide structures, implementation becomes problematic, as the RGWR waveguide must be positioned such that there is sufficient clearance between the end of the rigid waveguide and the bottom of the tank, to compensate for significant variations in temperature which would cause expansion/contraction of the tank and potentially damaging the bottom of the waveguide. In contrast, flexible RGWR waveguide structure alleviates such difficulties and even enables the flexible "hose-like" waveguide structure to engage with (rest on) the tank bottom without deleterious effects.

According to another aspect of the present disclosure, the RGWR may implement a shaped dielectric structure in the waveguide to enhance fast-propagating modes to improve echoes. As described herein, the RGWR uses too-large diameter waveguides due to physical constraints for purposes of liquid level sensing. This causes multi-mode propagation where different parts of the transmitted signal propagate at different speeds. This causes fragmentation of the echo from the liquid and reduces its amplitude, both factors making determination of the liquid level less reliable. To combat this problem, the RGWR is adapted to incorporate a dielectric director inside the waveguide in proximity to the radar chip. In embodiments, the dielectric director may take the shape of a cone or cone-like structure pointing toward the liquid, a rod ending in a cone or cone-like structure pointing at the liquid, a continuous surface focusing lens or a Fresnel lens.

According to another aspect of the present disclosure, the RGWR may implement a structure enabling level measurements directed upward from the bottom of tank. Using a sealed dielectric window, the RGWR gauge may be mounted to the bottom of the tank with the waveguide pointing toward the top of the tank. The dielectric window may be incorporated in the gauge or may be incorporated into the tank or may comprise the wall or bottom of the tank, for example, in plastic tanks. The EM energy is directed up from the bottom of the tank and is reflected from the liquid surface and back towards the gauge electronics. The gauge electronic circuitry may be programmed with the dielectric constant of the liquid, which is used to compensate for the speed of the EM energy in the liquid and to calculate the liquid level. Such configuration of the RGWR is beneficial for space constrained applications.

In another embodiment, the system (see e.g. FIG. 8) is configured to estimate the dielectric constant of the liquid by measuring echo amplitude. In an embodiment, the RGWR incorporates a method where the amplitude of the liquid echo is correlated to the dielectric constant of the liquid. This may be accomplished using a lookup table of known materials, as well as optionally obtaining estimates of the age of the liquid (e.g. based on historical or analytical data). The results may be communicated out from the system, or used for additional applications and characteristic determinations, as is understood by one of ordinary skill.

In another aspect, the system may be configured to determine interface levels of multiple liquids. For tanks containing two or more liquids that form distinct layers (e.g. oil and water), the RWGR employs software algorithms for analyzing echo profiles to read the level of both of the layers, as is understood by one of ordinary skill.

Track degradation of anhydrous ammonia may be accomplished by measuring dielectric constant or loss tangent. In another embodiment, there is provided a reflector (e.g. obstruction) positioned at the bottom of the waveguide to cause an echo from the submerged end of the waveguide. The amplitude of the liquid echo is measured and used to calculate the dielectric constant of the liquid. The amplitude of the reflector echo is measured and used to calculate the dielectric constant and the loss tangent (amount of energy absorbed and heated up as the energy passes through) of the liquid. By providing a reflector at the bottom of the waveguide, one can see the echo from the surface but also the energy from the bottom of the surface coming back to the radar chip. In this manner, the system is configured to calculate the lossiness of the liquid, which is a function of its chemical composition, as well as any changes and amounts of change. In another embodiment, the reflector may be positioned on the bottom of the tank and reflected back through the waveguide to the radar chip (assuming coordination between the location of the tank reflector and waveguide). In this manner, both distance and amplitude measurements associated with the liquid under test may be utilized.

According to another aspect, the system may be further configured to enable reading slightly below the bottom of the waveguide. As is understood, many tanks expand and contract as a function of temperature. For this reason, the level gauge with rigid hollow waveguide may not extend too close to the tank bottom, to avoid damage resulting from the waveguide tube hitting the bottom as the tank shrinks. According to an embodiment, the RGWR is configured to identify the bottom of the waveguide in the echo using stored information about its location and may be further configured to scan for echoes in the region past (i.e. beyond) the distal end of the waveguide. This allows level indication in the region below the waveguide and above the bottom of the tank that would otherwise be unreadable. More particularly, the RGWR includes an algorithm and processing that would be sensitive to the echo a short distance beyond the end of the waveguide. For open waveguide configurations, EM radiation exiting the waveguide would travel through the liquid and be reflected back through the waveguide. The system therefore processes the echo profiles, as is understood in the art, enabling the system to gain information beyond the end of the waveguide.

According to a further aspect, a zero subtract algorithm may be implemented to enhance system processing. In an embodiment, the echo from an empty tank is stored in the memory of the RGWR gauge. This stored echo profile is subtracted from subsequent level measurement echoes to compensate for high level false echoes. The stored echo may be recorded during factory calibration or may be recorded in the field.

According to a further aspect, a float may be provided in the waveguide for purposes of enhancing level measurements. According to an embodiment, for liquids with very low dielectric constants, a float is provided in the RGWR waveguide to reflect the EM energy. A stored offset is subtracted from the level to compensate for the float height above the liquid level. In an embodiment, the compensation factor is adjusted according to the determined density of the liquid.

According to a further aspect, the system and method may use only the magnitudes of values extracted from I/Q data. According to an embodiment, the RGWR processing utilizes echo magnitudes extracted from raw I/Q data according to the formula magnitude=sqrt($I^2+Q^2$). This magnitude data comprises an echo profile which is operated on by algorithms, as known in the art to extract the level signal. Processing magnitude signals eliminates a problem with non-monotonic level signals caused by phase additions when using large diameter waveguides.

According to a further aspect, when using large waveguides for the RGWR, the echo profile is operated on using one or more echo reform algorithms, as is known in the ultrasonic arts.

For applications where an echo is too high to use but can still determine is high and not LOE or low. Echo profiles from various levels in the blanking zone of the sensor and for the empty sensor are stored. During a level measurement these stored echoes are then correlated with the measured echo profile to determine a) if the level is in the blanking zone, b) the echo approximate level, and/or c) to determine if the tank is empty.

Structure at End of Hollow Waveguide. As described herein above, in one embodiment, the distal end (e.g. 24 of FIG. 1) of the hollow waveguide is open for receiving liquid from the tank for measurement. The open structure also permits EM radiation to exit the structure. (A small hole at the top portion (not shown) is also provided to ensure the waveguide does not contain a bubble). In another embodiment, the hollow waveguide may be configured with a structure to constrain the EM radiation from escaping while maintaining access to the liquid in the tank. In an embodiment, close openings made be made at the bottom of the waveguide such as a structure having only small holes or screens. The resolution of a radar level measurement gauge is in part determined by the range of frequencies used to make the measurement. The allowed range is governed by laws specific to each geographical region. These laws set aside certain frequencies for use for industrial, scientific and medical (ISM) purposes. The regulations limit operations of radar level measurement gauges to these ISM bands, to avoid interference with other radio band users, which restriction limits the gauges' resolution. The RGWR may be configured to incorporate a semi-sealed waveguide to block any EM transmission from leaving the waveguide, and thus eliminate the gauge being subject to the ISM regulations. This advantageously allows the gauge to operate using wider frequency ranges and improves precision. The waveguide cannot be totally sealed since the liquid must enter the waveguide for the gauge to measure the level (i.e. impervious to the EM radiation but pervious to the liquid). The seal may consist of small holes (not shown) in the waveguide less than 2 wavelengths of the operating frequency in free space in diameter and greater than 0.1 micron in diameter. The seal may also consist of a conductive mesh screen, as in a metal or conductive plastic mesh, with a mesh size between 2 wavelengths and 0.1 micron in width. The RGWR gauge mounted on the top of the waveguide may be configured to receive similar RF shielding.

Figure 3:
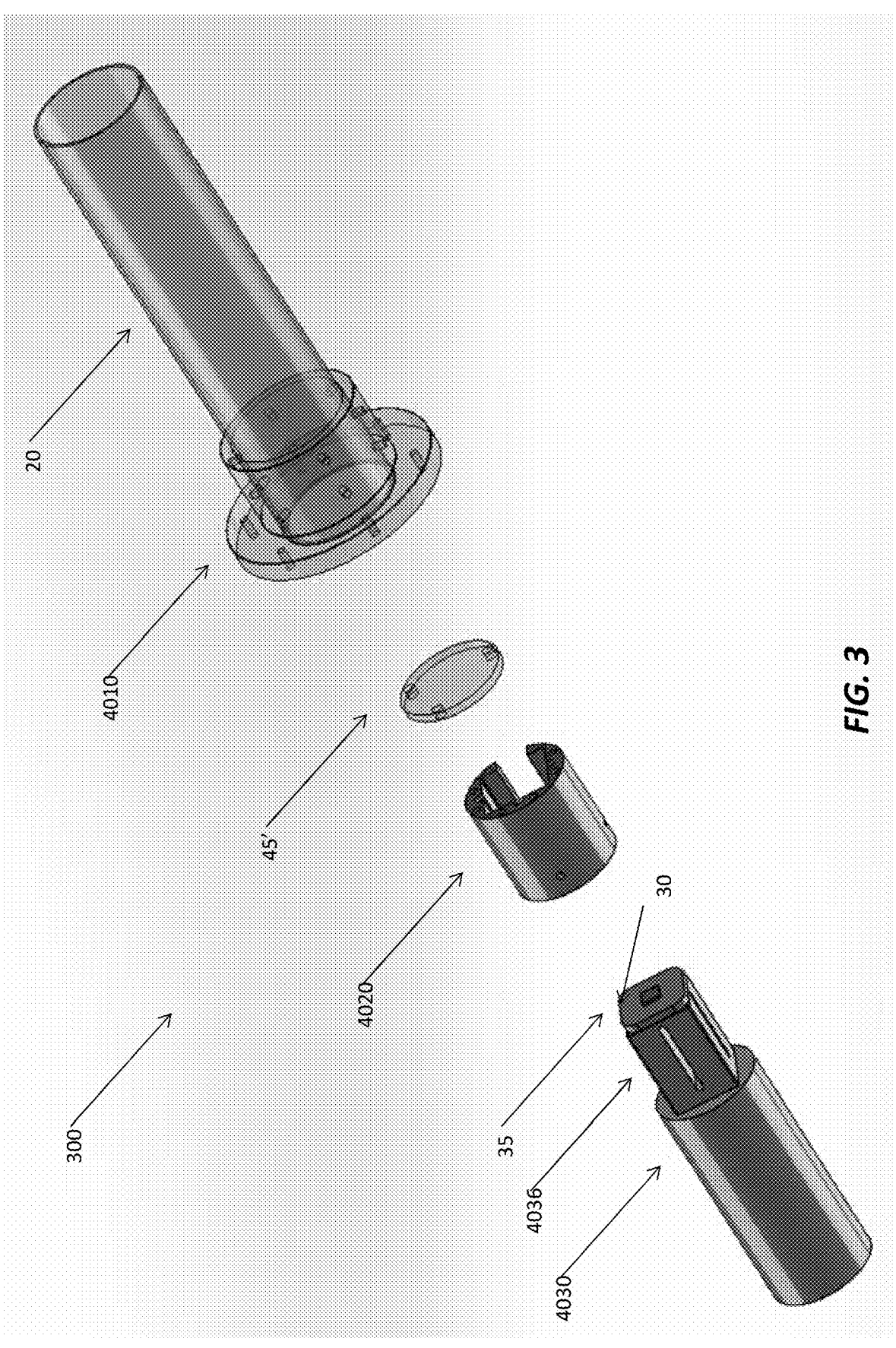
FIG. 3 shows an exemplary exploded view of components of a rodless guided wave radar device having its PCB containing the radar chip for insertion within the waveguide according to another embodiment of the present disclosure.

According to a further aspect, the system and method further provides a nose structure to place the chip down into a waveguide. In an embodiment, echo characteristics are expected to be improved if the radar chip is located a short distance into the waveguide, as opposed to being flush with (or outside of) the end of the waveguide. The structure of the plastic case containing the instrument is shaped so that the chip module 30/35 is located down inside of the waveguide. FIG. 3 shows an exemplary exploded view of a given RGWR configuration 300. As shown, the waveguide tube 20 is connected to a flange mounting 4010 at the upper opening of the tube proximal to the radar chip 30. In embodiments, the length of the tube may be of greater length relative to the component sizes shown in FIG. 3. A dielectric window or disc (e.g. plastic disc) is removably insertable into the opening of the tube for filling. Cylindrical ring 4020 is sized to accommodate the radar chip and movable thereon to control or adjust the distance between the dielectric window and the surface of the radar chip. Handle 4030 with protuberance 4036 is configured to place the PCB and radar chip for insertion of the chip and assembly structure into the waveguide 20 at different depths within the waveguide.

Figure 4:
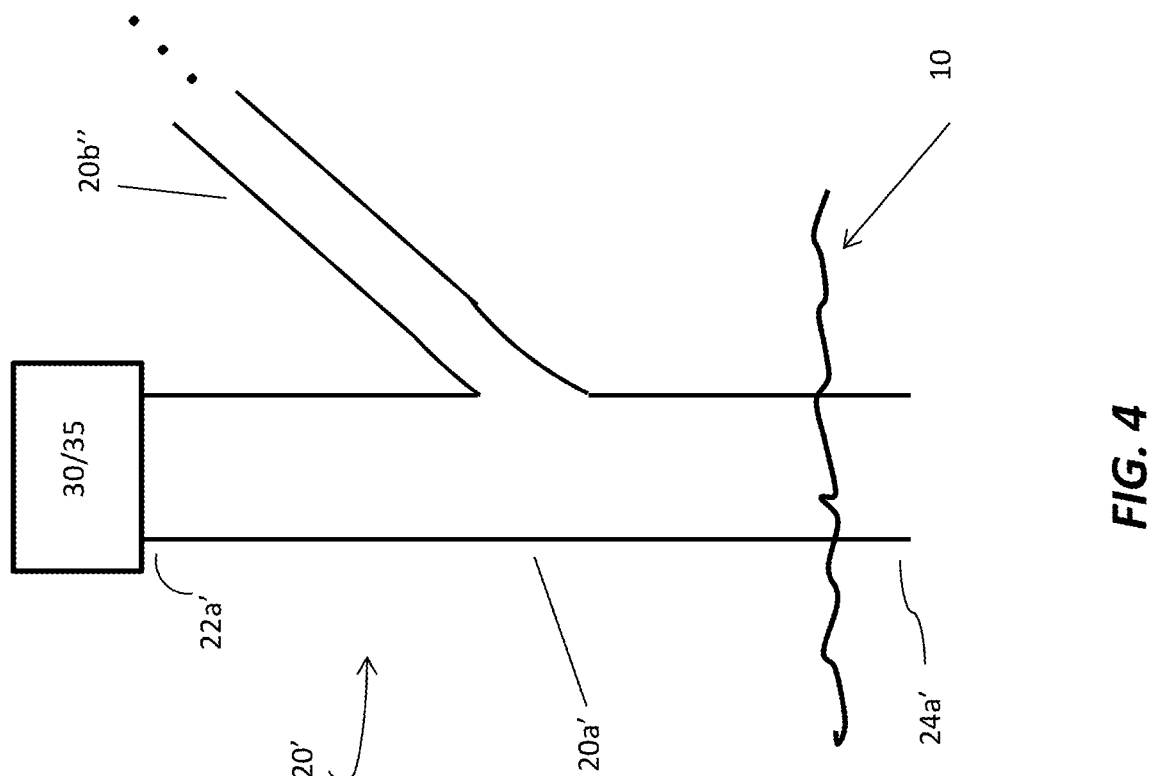
FIGS. 4-7 show exemplary illustrations of a rodless guided wave radar device according to additional embodiments of the present disclosure.

According to a further aspect, the system and method further provides a bifurcated waveguide to allow a single tank entry to act as level and fill. In some tanks there is limited room for entry or the added expense of multiple tank entries cannot be supported. The RGWR provides a bifurcated waveguide arrangement (e.g. Y-shaped waveguide), or even multiple bifurcations, which serve to allow one tank entry to serve as a measurement port and fill/draw or other customer defined port. FIG. 4 shows an exemplary embodiment wherein hollow waveguide 20' has a first portion 20a' extending upright with the aft end 24a' of the waveguide extending to the bottom of the tank, the proximal end 22a' receiving PCB ad radar chip module 30/35, and arm portion 20b' receiving the other tank opening (e.g. fill or draw). Such arrangement may be useful for certain applications, such as propane tanks that require adequate vapor space (e.g. head space) for pressure expansion. In a further embodiment, the bifurcation transition of the tube may use mesh screens so that the liquid from a fill port can pass, but the RF signal the waveguide appears continuous and no echo is generated at the bifurcation. Alternatively, small holes may be used at the transition, which for small holes has the same effect as the mesh screen. In both cases the apertures should be less than 2 wavelengths across and preferably less than ⅒ wavelength. It is also envisioned to use a simple Y pipe connection and then address the resulting echo from the transition using signal processing means such as echo subtraction or placement of the transition into the instruments' blanking zone.

According to a further aspect, the system and method further provides a waveguide with embedded spit tube for propane tanks. In a further embodiment, propane tanks use a 'spit' tube and valve to indicate a full tank and to prevent the operator from overfilling. Propane tanks also typically have a small area for tank entries. According to another embodiment, the device includes placement of the spit tube into the waveguide so that both level and spit operation is accommodated through the same tank opening. The spit tube enters the waveguide outside of the tank and extends down inside the waveguide into the tank. Best results are obtained when the spit tube is a relatively small diameter structure and when the spit tube is constrained to lay along one side of the ID of the waveguide, e.g., by attachment to the ID of the waveguide, to thereby minimize disruption of the radar chip and waveguide processing. In another embodiment the spit tube enters the waveguide outside of the tank entry and then exits the waveguide at a level below the tank entry. In this way the spit tube only forms an obstruction in the waveguide for a short portion of the measurement span.

According to a further aspect, the system and method further provides a waveguide with thermal isolation. For measurements on hot equipment such as measuring engine oil level for an operating engine, the gauge may be heated to high temperatures. To avoid the high cost of high-temperature electronics, the waveguide or mounting flange of the gauge provides thermal isolation from the hot structure. This can be accomplished by implementing an extended waveguide 20 so that the electronics (30/35) are physically far removed from the heat source, or by providing thermal insulators in the conduction path from the heat source to the electronics. This may be embodied by inserting a section of waveguide with insulation properties such as a high-temperature plastic or other such material. To provide operation as a waveguide the insulator needs to be of an appropriate material, for example, provided with a thin conductive layer, such as a sputtered metallization or a thin sheet of metal material on its inner diameter. Alternatively, the insulator may be constructed using a conductive polymer (plastic). Another method for isolating the electronics from the heat source is to position an insulator between the waveguide and the structure of the heat source. For example, a thermal insulator may be used for the mounting flange of the waveguide or an insulating material may be applied between the mounting flange and the waveguide.

Figure 7:
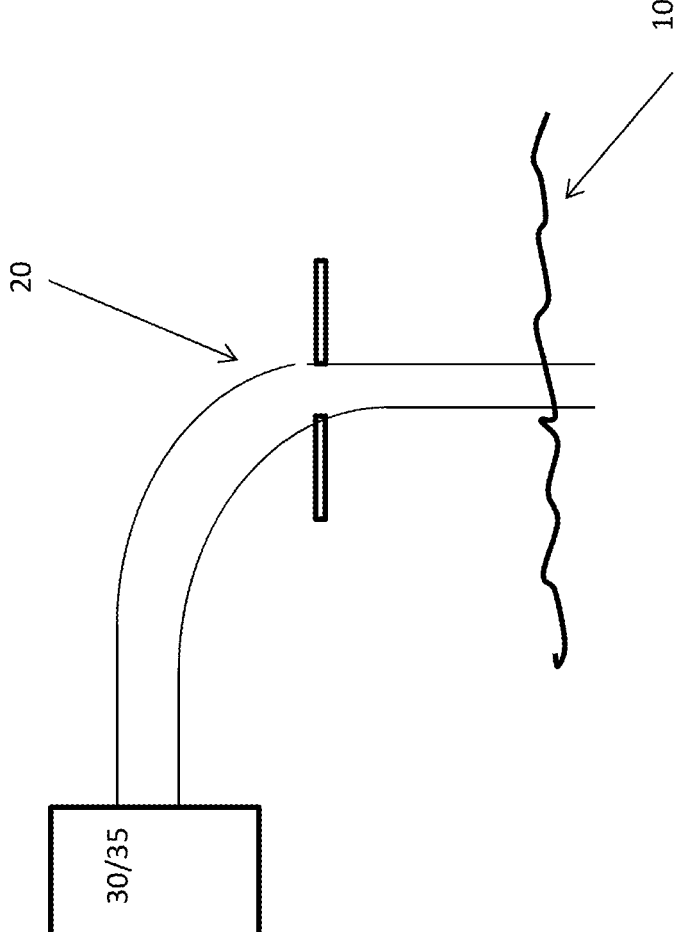

According to a further aspect, the system and method further provides a curved waveguide for side-mounting of electronics. As described herein, for many applications there is low head room between the tank and other structures, leaving little room to mount or access a level gauge. In such cases the RGWR curved waveguide structure may be implemented. Where the waveguide exits the tank, it is gradually curved so that the electronics unit mounts to the side of the tank (FIG. 7). Application of such curved waveguide RGWRs may include, by way of example only, barrel tanks positioned about the undercarriage or the footrest of tractor trailers.

According to a further aspect, the system and method further provides an extended waveguide for reduction of blanking zone. As described herein, radar level gauges have a blanking zone at the face of the gauge where level readings are not reliable. This is due to cross-talk between the transmit and receive electronics. This often results in unreliable or even missing level data when the liquid is near or at the top of the tank. This problem is eliminated by extending the waveguide out the top of the tank by an amount equal to or greater than the dead zone. Then the beginning of the measurement can coincide with the highest liquid level which results in reliable readings of the level over the complete span of the tank. If there is insufficient height above the tank to accommodate the extended waveguide it may be shortened to less than optimum, resulting in a smaller blanking zone in the tank. The waveguide can also be curved or even coiled to take less head room over the top of the tank.

Figure 5:
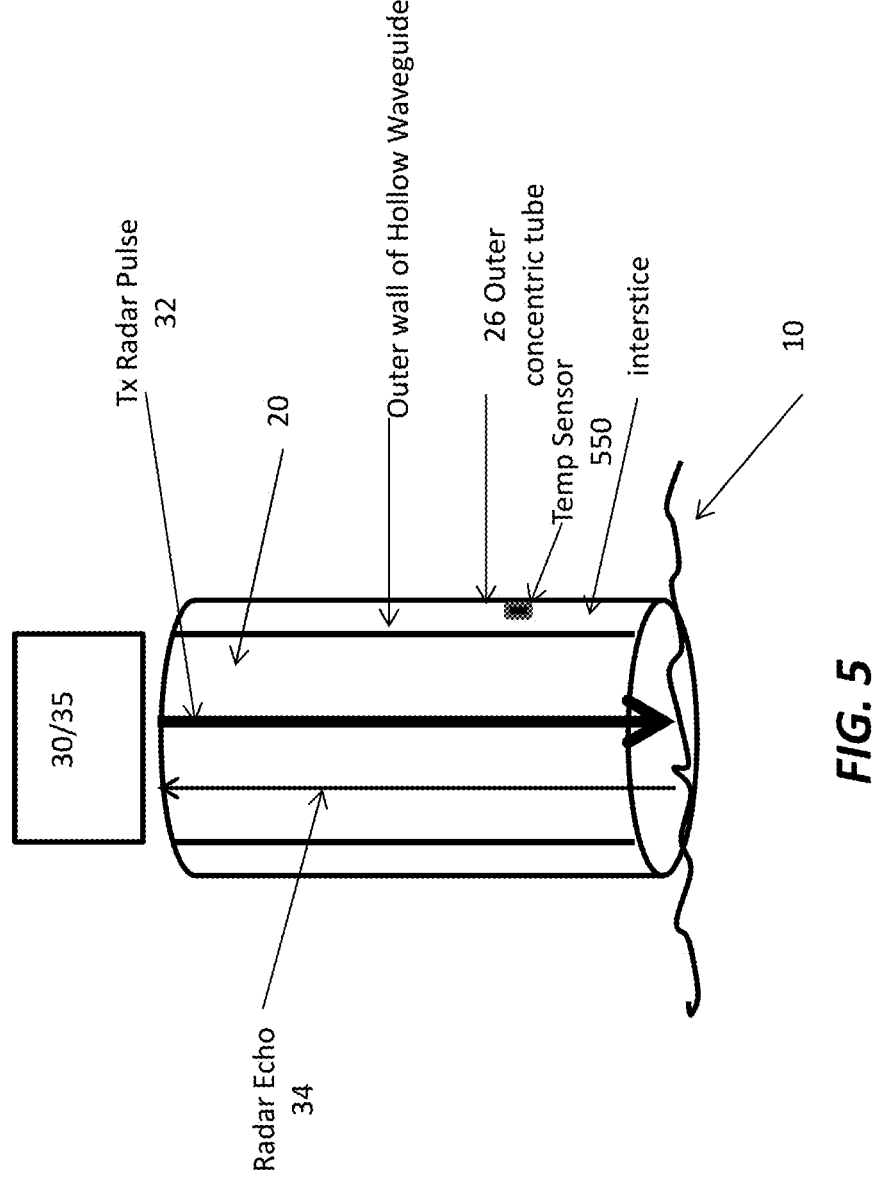

According to a further aspect, the system and method further provides a temperature sensor for volumetric readout correction. In another embodiment, it is often desirable to provide a volumetric readout of the liquid in a tank. Many liquids expand and contract with temperature and so the addition of a temperature sensor 550 to the single-chip radar GWR device enables automatic volumetric compensation. In one arrangement the waveguide 20 is nested coaxially with another tube 26 and a temperature sensor 550 is inserted into the interstice, as shown in FIG. 5. In another arrangement, the temperature sensor may be configured within or routed down the inner diameter (ID) of the hollow waveguide 20 and positioned toward one wall of the hollow waveguide tube, so that echo interference will be at a minimum. In this case the echo interference may be compensated for in echo processing, by storing the echo interference in the memory of the gauge and subtracting it from subsequent measurement echoes. In another case the temperature sensor is located in the electronics and the temperature of the liquid is inferred from this reading.

According to a further aspect, the system and method further provides a temperature sensor for echo profile correction. In some systems the RF transmitter and receiver parameters vary by temperature. For example, radar echoes will be of lower amplitude for relatively hot environments. In one embodiment, the RGWR includes a temperature sensor on the associated electronic processing equipment so that the temperature reading is used (e.g. via process controller, FIG. 8) to compensate the echoes for temperature effects using stored information about the temperature sensitivity of the system.

Figure 6:
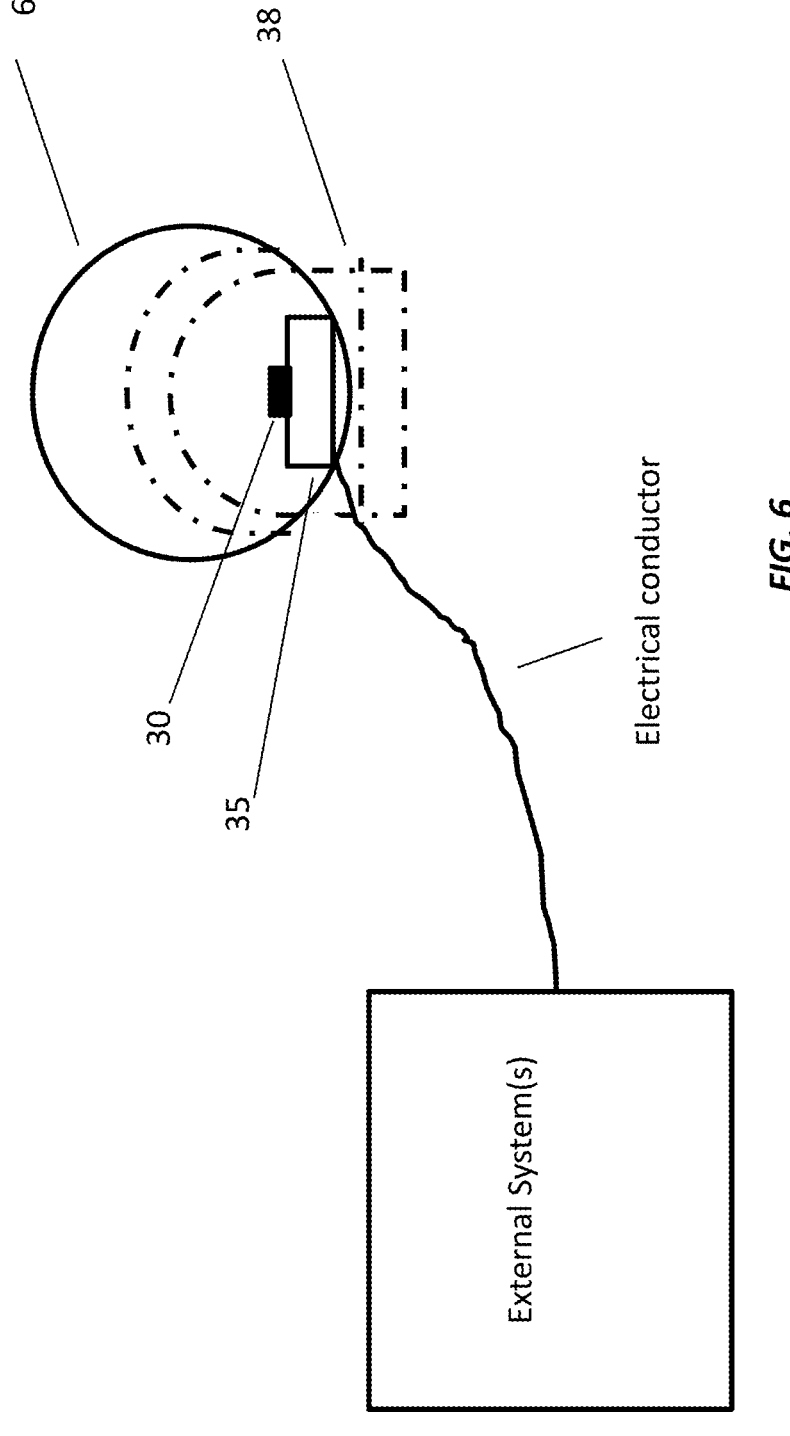

According to a further aspect, the system and method further provides a bullseye indicator. In another embodiment, the system of the present invention may be implemented in a system measuring through the glass of a bullseye indicator for presence/absence point level detection as for refrigerant. In this application the radar sensor is used to read presence/absence of the liquid behind a bullseye indicator. The mounting of the radar sensor 30/35 may be implemented within a mechanical housing 38 for, in one embodiment, removable attachment to the bullseye glass indicator 60 on a tank (FIG. 6). The mechanical housing 38 includes a mount assembly and contains the radar chip sensor and PCB electronics (30/35) for impinging directly onto the bullseye can be fixed and permanent, or semi-permanent, or can be an easily removable design using a clip so that the bullseye can also be observed normally by an operator. In one embodiment, the radar chip structure 30/35 may be mounted to the bullseye using a clear plastic housing (shown in phantom in FIG. 6) so that the bullseye is still visible to operators simultaneous with radar measurements. Such devices may be implemented as snap on or other easily removable housing structure, as is known to one of ordinary skill. In an embodiment, processing of the transmit and echo returns within the gauge is configured such that the device operates on an edge of the window, which enables simultaneous operator visual as well as radar chip operation Tx/Rx processing, with the electronics processing module in communication with external systems for telemetry signal processing or data logging processing. In an exemplary embodiment, this device may not include a hollow waveguide structure but rather the housing 38 containing the radar chip module 30/35 is engaged onto the bullseye indicator with the module proximal to the indicator 60, with the system operative to take a reading when a) the bullseye shows a bubble; and b) the bullseye does not show a bubble. Alternatively, a serpentine or other such waveguide (e.g. a serpentine plastic waveguide plated with a metal such as aluminum) may be utilized to remove blanking zone problems in the event that implementation of the device proximal to the bullseye and hence, liquid, would result in difficulties in measurements.

According to a further aspect, the system and method further provides a state classifier based on full echo analysis. In an embodiment, the RGWR system includes one or more algorithms configured to process entire echo and classify states when discrete echoes are not apparent. Normally, radar echoes are analyzed by searching for echoes with desired parameters such as the first echo to appear or the highest amplitude echo or the echo with the largest area, but in some corner operating regimes these echo parameters are not useful. For example, when the material as at the sensor face there are no real discernable level echoes due to energy bleed between the transmit and receive antennas. To detect the state of the system in these situations the entirety of the echo profile is processed by correlation to previously stored echoes of the various corner conditions. In this way the specific corner state occurring can be identified. In another embodiment test echoes in normal and corner conditions are recorded and used to train an artificial neural network (ANN). The ANN is then programmed into the computing means of the gauges to classify when the received measurement echoes are in the corner state.

According to a further aspect, the system and method further provides for microwave reflection/absorption spectroscopy using single chip radar. In this mode of operation, the frequency of the transmitted signal is varied and information is extracted from the echo profile for each individual frequency. The variation of the extracted echo information reveals physical properties of the liquid. Two classes of echoes are used. In the first the reflection of the energy from the surface of the liquid is used and obtains the dielectric constant of the liquid. In the second class the echo from the bottom of the probe, or from a target substantially submerged in the liquid is analyzed, which gives the dielectric constant of the liquid and the loss tangent. In one embodiment a target is placed at the end of the waveguide, which allows measurement of the liquid level and the bottom target simultaneously. In another measurement arrangement the transmit antennal is located at one end of the waveguide and the receive antenna is located at the opposite end of the waveguide, or at least some distance from, the transmit antenna. This offers the advantage of a more precise measurement of the liquid properties. Such measured material properties over time can be used to determine degradation of the material. For example, as anhydrous ammonia degrades over time, it requires dosing with expensive chemicals to maintain its quality. The RGWR system measuring material properties can be used to control the dosing equipment.

According to a further aspect, the system and method further provides vibration detection by measuring level. The RGWR enables multiple level readings over time to be analyzed and small variations of level vs time are extracted. Fast variations in the range of 0.1 Hz to 20 kHz yield information about the vibration of the fuel, which is coupled to the machine and so yields information about the operating state of the machine.

According to a further aspect, the system and method further provides for detection of fuel or vehicle theft or unauthorized use by measuring liquid level. The RGWR enables multiple level readings over time to be analyzed and small variations of level vs time are extracted. Slow variations in the range of 0.1 Hz to 0.0001 Hz yield information about consumption of the fuel. This information is communicated from the gauge and can be used by an external control or telemetry system. The information coupled with time information can also be used to detect fuel theft or equipment theft during times when the equipment is known to be out of service (e.g. condition monitoring), for example during night time hours. The RGWR may be combined with a telemetry monitoring system for detecting aberrant or unusual characteristics (e.g. vibrations) and sending an alert signal in response thereto. In one use case the information can be processed in the gauge using a pre-stored threshold value. If the variation exceeds the stored rate the gauge can wake an external system to sound an alarm.

According to a further aspect, the system and method further provides for intrinsic safety features. The RGWR system operates with a single-chip radar with circuitry built to intrinsic safety standards, and includes appropriate short-range communications processing, including but not limited to Bluetooth, and further incorporating non-contacting wireless communications and connections standards such as IEEE 802.11 for the transfer of power or data.

Thus, there is disclosed a guided wave radar sensor gauge for measuring at least one characteristic of a liquid in a vessel, comprising: a hollow waveguide for conveying microwave radiation, the hollow waveguide adapted to be disposed in a vessel for containing a liquid, the hollow waveguide having a first end and a second end; a single chip radar sensor mounted on a printed circuit board and disposed proximal to the first end of said hollow waveguide, said single chip radar sensor configured to transmit a millimeter wavelength signal into the first end of said hollow waveguide for propagating down the waveguide toward the second end, and to receive at least a return echo from said signal based upon a change in impedance upon encountering said liquid and propagating in the reverse direction of the waveguide, said single chip radar sensor including electronic circuitry for determining at least one characteristic of the liquid located in the waveguide based on detection of an impedance change according to time domain reflectometry. A mount assembly is configured to position the single chip radar sensor mounted on the printed circuit board over the first end of the hollow waveguide for transmitting and receiving the microwave radiation via the hollow waveguide; and a barrier structure sealingly protects the single chip radar mounted on said printed circuit board from exposure to contaminants within the hollow waveguide, while permitting microwave propagation between the single chip radar and the hollow waveguide. In an embodiment, the barrier structure is integrated within the hollow waveguide. In an embodiment, the barrier structure is one of: a ceramic material; a quartz, or a sapphire crystal fixed into the hollow waveguide. In an embodiment, the barrier structure is a glass window fixed into the hollow waveguide by fusion or O-rings. In an embodiment, the barrier structure is a glass window fused into the hollow waveguide. In an embodiment, the barrier structure is integrated onto the single chip radar mounted on said printed circuit board. In an embodiment, a polymer sealingly covers the single chip radar and printed circuit board. In an embodiment, at least a portion of the mount assembly, the barrier structure, and single chip radar mounted on the printed circuit board barrier structure form a removable head for removably connecting to the first end of the hollow waveguide. In an embodiment, the single chip radar mounted on the printed circuit board, and at least a portion of the mount assembly, are disposed within the hollow waveguide.

The guided wave radar sensor gauge may further comprise a spacer formed of a material adapted to slow the propagation of the microwave radiation therethrough. The spacer material may be disposed between the single chip radar and the first end of the hollow waveguide for reducing the blanking time of the single chip radar receiver. In an embodiment, the spacer material is formed of material having a high dielectric constant and a low loss tangent.

In an embodiment, a dielectric lens is disposed within the waveguide and proximal to the radar sensor for controlling mode propagation by collimating multi-mode propagation signals to reduce propagation speed differentials and echo fragmentation. The dielectric lens disposed within the waveguide may comprise one of a cone pointing toward the liquid, a rod ending in a cone pointing at the liquid, a continuous surface focusing lens, or a Fresnel lens.

In an embodiment, the second end of the hollow waveguide has at least one opening for receiving the liquid in the container. The second end of the hollow waveguide may have a structural electromagnetic barrier for sealing the bottom of the waveguide from propagating radiation out from said bottom of the waveguide. In an embodiment, the structural electromagnetic barrier at the second end of the hollow waveguide may comprise a metal mesh. In an embodiment, hollow waveguide is a metal tube. In an embodiment, hollow waveguide is a curved metal tube. In an embodiment, hollow waveguide is a flexible tube. In an embodiment, the flexible tube is formed of a conductive polymer material. In an embodiment, the flexible tube is one of a carbon or metal filled polymer, or a polymer treated with a metal coating on its inner diameter or outer diameter. In an embodiment, the metal coating is sputtered aluminum on Mylar.

In an embodiment, the single chip radar and printed circuit board are encapsulated in an encapsulant material forming an integrated subassembly, the encapsulate formed about the surface of the single chip radar sensor facing the hollow waveguide to form a lens for focusing the electromagnetic radiation to and from the single chip radar. In an embodiment, the encapsulant comprises a molded polymer material. In an embodiment, the encapsulant comprises an epoxy or acrylate resin.

Figure 8:
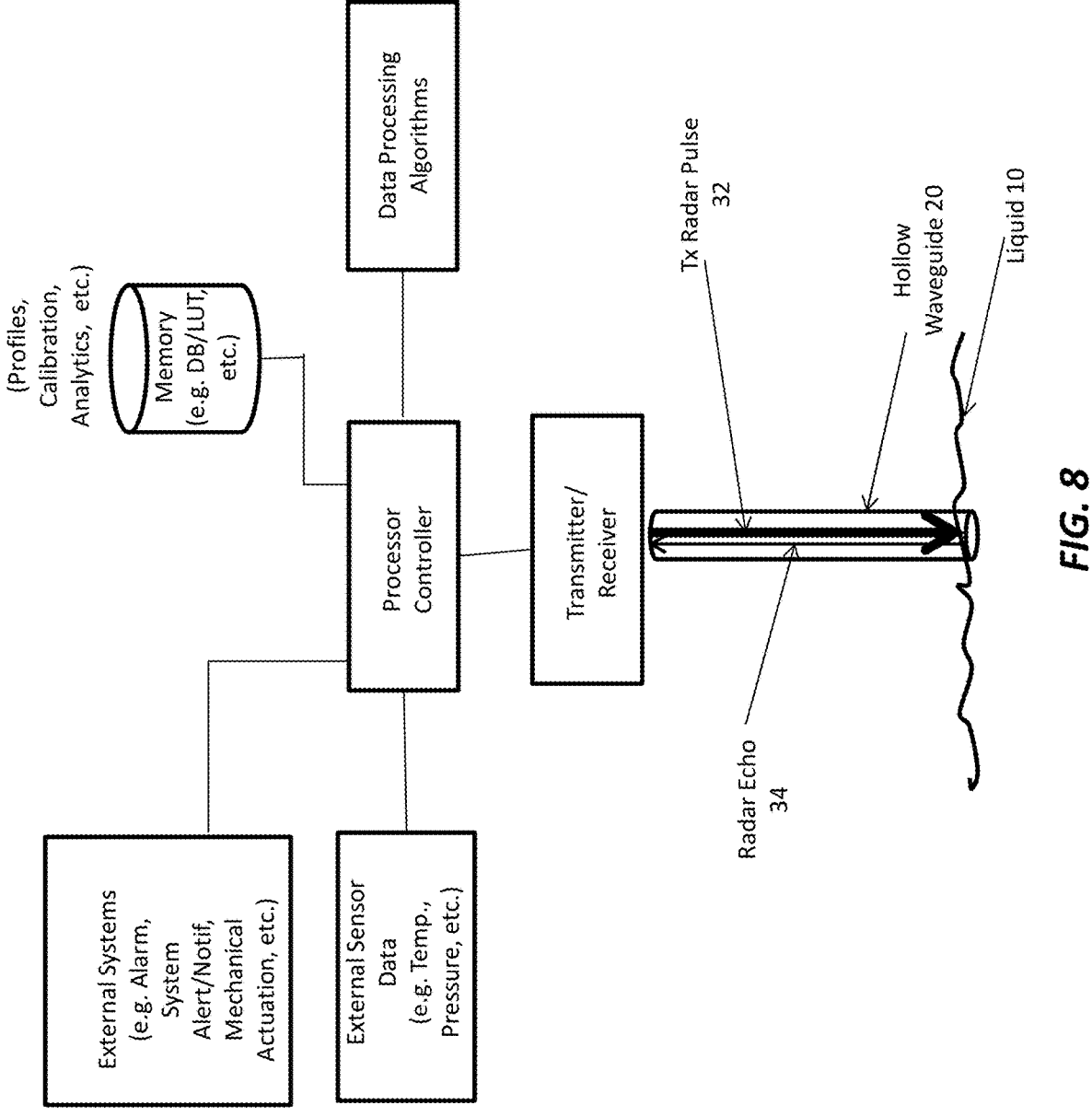
FIG. 8 shows an exemplary block diagram illustrating functional processing components of the system according to an embodiment of the present disclosure.

Although the methods and features described above with reference to the figures are described above as performed using the example devices and architectures of FIGS. 1 through 7 and the exemplary system of FIG. 8, the methods and features described above may be performed using other appropriate architectures and/or computing environments. Although features and elements are described above in particular combinations, each feature or element can be used alone or in any combination with or without the other features and elements. For example, each feature or element as described with reference to the figures may be used alone without the other features and elements or in various combinations with or without other features and elements. Sub-elements of the methods and features described above with reference to the figures may be performed in any arbitrary order (including concurrently), in any combination or sub-combination.

What is claimed is:

1. A guided wave radar sensor gauge for measuring at least one characteristic of a liquid in a vessel, comprising:
   a hollow waveguide for conveying microwave radiation, the hollow waveguide adapted to be disposed in a vessel for containing a liquid, the hollow waveguide having a first end and a second end;
   a single chip radar sensor mounted on a printed circuit board and disposed proximal to the first end of said hollow waveguide, said single chip radar sensor configured to transmit a millimeter wavelength signal into the first end of said hollow waveguide for propagating down the waveguide toward the second end, and to receive at least a return echo from said signal based upon a change in impedance upon encountering said liquid and propagating in the reverse direction of the waveguide, said single chip radar sensor including electronic circuitry for determining at least one characteristic of the liquid located in the waveguide based on detection of an impedance change according to time domain reflectometry;
   wherein a mount assembly is configured to position the single chip radar sensor mounted on the printed circuit board over the first end of the hollow waveguide for transmitting and receiving the microwave radiation via the hollow waveguide; and
   wherein a barrier structure comprises a dielectric window sealed into the hollow waveguide at the first end, the dielectric window sealingly protecting the single chip radar sensor mounted on said printed circuit board from exposure to contaminants within the hollow waveguide, while separating the single chip radar sensor from the interior of the hollow waveguide and permitting microwave propagation between the single chip radar sensor and the hollow waveguide.

2. The guided wave radar sensor gauge of claim 1, wherein the dielectric window is a sapphire or quartz crystal fixed into the hollow waveguide by fusion.

3. The guided wave radar sensor gauge of claim 1, wherein the barrier structure is a glass window fixed into the hollow waveguide by fusion or O-rings.

4. The guided wave radar sensor gauge of claim 3, wherein the barrier structure is a glass window fused into the hollow waveguide.

5. The guided wave radar sensor gauge of claim 1, wherein the barrier structure further comprises a dielectric covering disposed over the single chip radar sensor mounted on said printed circuit board to provide additional protection of the single chip radar sensor and the printed circuit board from environmental contaminants.

6. The guided wave radar sensor gauge of claim 5, wherein the dielectric covering comprises a polymer that sealingly covers the single chip radar sensor and at least a portion of the printed circuit board.

7. The guided wave radar sensor gauge of claim 1, wherein at least a portion of the mount assembly, the barrier structure, and single chip radar sensor mounted on the printed circuit board form a removable head for removably connecting to the first end of the hollow waveguide.

8. The guided wave radar sensor gauge of claim 1, wherein the single chip radar sensor mounted on the printed circuit board, and at least a portion of the mount assembly, are disposed within the hollow waveguide.

9. The guided wave radar sensor gauge of claim 1, further comprising a spacer formed of a material adapted to slow the propagation of the microwave radiation therethrough, the spacer material disposed between the single chip radar sensor and the first end of the hollow waveguide for reducing the blanking time of the single chip radar sensor receiver.

10. The guided wave radar sensor gauge of claim 9, wherein the spacer material is formed of material having a high dielectric constant and a low loss tangent.

11. The guided wave radar sensor gauge of claim 1, further comprising a dielectric lens disposed within the waveguide and proximal to the radar sensor for controlling mode propagation by collimating multi-mode propagation signals to reduce propagation speed differentials and echo fragmentation.

12. The guided wave radar sensor gauge of claim 11, wherein the dielectric lens disposed within the waveguide comprises one of a cone pointing toward the liquid, a rod ending in a cone pointing at the liquid, a continuous surface focusing lens, or a Fresnel lens.

13. The guided wave radar sensor gauge of claim 1, wherein the second end of the hollow waveguide has at least one opening for receiving the liquid in the vessel.

14. The guided wave radar sensor gauge of claim 1, wherein the second end of the hollow waveguide has a structural electromagnetic barrier for sealing the bottom of the waveguide from propagating radiation out from said bottom of the waveguide.

15. The guided wave radar sensor gauge of claim 1, wherein the structural electromagnetic barrier at the second end of the hollow waveguide comprises a metal mesh.

16. The guided wave radar sensor gauge of claim 1, wherein the hollow waveguide is a metal tube.

17. The guided wave radar sensor gauge of claim 1, wherein the hollow waveguide is a curved metal tube.

18. The guided wave radar sensor gauge of claim 1, wherein the hollow waveguide is a flexible tube.

19. The guided wave radar sensor gauge of claim 1, wherein the flexible tube is a conductive polymer material.

20. The guided wave radar sensor gauge of claim 19, wherein the flexible tube is one of: a carbon or metal filled polymer, or a polymer treated with a metal coating on its inner diameter or outer diameter.

21. The guided wave radar sensor gauge of claim 20, wherein the metal coating is sputtered aluminum on Mylar.

22. The guided wave radar sensor gauge of claim 2, wherein the dielectric window is a sapphire crystal fixed into the hollow waveguide.

23. The guided wave radar sensor gauge of claim 1, wherein the single chip radar sensor and printed circuit board are encapsulated in an encapsulant material forming an integrated subassembly, the encapsulant material formed about the surface of the single chip radar sensor facing the hollow waveguide to form a lens for focusing the electromagnetic radiation to and from the single chip radar sensor.

24. The guided wave radar sensor gauge of claim 23, wherein the encapsulant material comprises a molded polymer material.

25. The guided wave radar sensor gauge of claim 23, wherein the encapsulant material comprises an epoxy.

26. The guided wave radar sensor gauge of claim 23, wherein the encapsulant material comprises an acrylate resin.

* * * * *